United States Patent
Bjorndahl et al.

(10) Patent No.: US 7,403,715 B2
(45) Date of Patent: Jul. 22, 2008

(54) FREE SPACE OPTICAL BUS

(75) Inventors: William D. Bjorndahl, Torrance, CA (US); John Joseph Berenz, San Pedro, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 712 days.

(21) Appl. No.: 10/639,992

(22) Filed: Aug. 13, 2003

(65) Prior Publication Data

US 2005/0036789 A1 Feb. 17, 2005

(51) Int. Cl.
*H04B 10/00* (2006.01)
*H04B 7/185* (2006.01)
*H04J 14/00* (2006.01)
*B64G 1/00* (2006.01)

(52) U.S. Cl. .............. 398/121; 398/118; 398/103; 398/60; 244/158.1; 455/13.3

(58) Field of Classification Search ............... 398/58, 398/60, 103, 127; 244/158.1; 455/13.3
See application file for complete search history.

(56) References Cited

U.S. PATENT DOCUMENTS

| | | | | |
|---|---|---|---|---|
| 4,706,241 | A | * | 11/1987 | Carse .................. 370/259 |
| 5,054,873 | A | | 10/1991 | Davis et al. |
| 5,113,403 | A | | 5/1992 | Block et al. |
| 5,198,684 | A | * | 3/1993 | Sudo ..................... 257/79 |
| 5,200,631 | A | * | 4/1993 | Austin et al. .......... 257/570 |
| 5,204,866 | A | | 4/1993 | Block et al. |
| 5,552,920 | A | * | 9/1996 | Glynn .................. 398/126 |
| 5,823,476 | A | * | 10/1998 | Caplin ................. 244/158.1 |
| 5,832,147 | A | | 11/1998 | Yeh et al. .............. 385/14 |
| 6,515,221 | B1 | * | 2/2003 | Varga .................. 174/384 |
| 6,529,300 | B1 | | 3/2003 | Milton et al. |
| 6,912,075 | B1 | * | 6/2005 | Ionov et al. ............ 398/126 |
| 2002/0021855 | A1 | | 2/2002 | Kim |
| 2003/0081281 | A1 | | 5/2003 | DeCusatis et al. |

(Continued)

FOREIGN PATENT DOCUMENTS

EP    1 284 429 A1    2/2003

(Continued)

OTHER PUBLICATIONS

European Search Report for corresponding EP 03 25 7808, completed Jul. 20, 2005.

(Continued)

*Primary Examiner*—Jason Chan
*Assistant Examiner*—Nathan M Curs
(74) *Attorney, Agent, or Firm*—Tarolli, Sundheim, Covell & Tummino LLP

(57) ABSTRACT

A free space optical bus system and method are provided for connecting two units of circuitry across a free space gap. A first unit of circuitry includes a multiplexer that combines a plurality of bus signals to obtain an electronic combined signal and a laser that is driven by the electronic combined signal to transmit an optical signal. A second unit of circuitry is separated from the first unit of circuitry by a free space gap. The second unit of circuitry includes a photodetector that receives the optical signal and transforms it into an electronic composite signal and a demultiplexer that divides the composite signal into a plurality of constituent signals.

10 Claims, 8 Drawing Sheets

U.S. PATENT DOCUMENTS

2003/0206134 A1* 11/2003 Lier et al. .................. 342/368
2004/0223476 A1* 11/2004 Jose et al. .................. 370/338
2005/0031355 A1* 2/2005 Shi et al. .................. 398/147

FOREIGN PATENT DOCUMENTS

EP 1284429 A1 * 2/2003
EP 1 345 340 A2 9/2003
GB 2 101 828 A 1/1983

OTHER PUBLICATIONS

Goodwill, et al., "Free Space Optical Interconnect at 1.25Gb/s/channel Using Adaptive Alignment", Nortel Networks, p.1-3.

"HFTA-04.0: Optical/Electrical Conversion in SDH/SONET Fiber Optic Systems", http://dbserv.maxim-ic.com/appnotes.cfm?appnote_number=649 Last viewed Apr. 22, 2002, p. 1-8.

William D. Bjorndahl and John Berenz, "New Technologies for Board Level Interconnect", IEEE, 2003.

* cited by examiner

FREE SPACE OPTICAL BUS

TECHNICAL FIELD

The present invention relates generally to communications systems, and more particularly to a free space optical bus.

BACKGROUND OF THE INVENTION

In the past several years, there has been a significant increase in the capacities of integrated circuit boards. As the capacities of individual boards have increased, greater numbers of high data rate interconnections between boards have become necessary. The increased need for interboard connections is difficult to satisfy using conventional technology. Higher interconnect densities lead to a greater possibility of cross talk and difficulties in assembly, as the fine pitch of the connectors require precise alignment with their respective pads on the board across the total length of the connector. Attempts to increase the data rates across the connectors are hampered by the dielectric and resistance losses experienced by conventional interconnect media at increased frequencies.

Conventionally, signals that need to be transmitted across boards are routed to the board edge. From there, the signals can be routed to an adjacent board or to a backplane. Current edge connectors may have an interconnect density of approximately fifty connections per inch. By utilizing both sides of the board, this can be doubled to one-hundred connections per inch. It is not uncommon for boards to require between five-hundred and one thousand connectors, requiring between five to twenty inches of board edge, depending on the configuration of the connectors.

Further exacerbating the need for increased interconnector density is a corresponding increase in the data rate of interboard transmissions. Interconnects carrying high data rate signals require a ground or power pin to either side to reduce interference with other high data rate signals. The amount of available connectors is thus effectively halved for a board receiving and outputting high data rate signals. Systems using low voltage differential signaling further compound the problem, requiring two interconnections to carry each signal.

Even as the number of necessary interconnects between boards have increased, the size of the various board components is decreasing. Accordingly, the size of the boards have also decreased, reducing the amount of available edge space. These factors have resulted in several efforts to increase the density of interconnections using conventional connector technology. These efforts have met with qualified success, but suffer from attenuation problems at high data rates over a distance. It is necessary to transfer signals over a significant distance in a conventional system bus within a complex digital system, as the signals need to be transported to a common system bus somewhere on its associated backplane, along the bus to its destination junction, and then along the junction to the destination board. The prior art has yet to provide an efficient, high data rate bus that is effective for a complex digital system.

A related problem can be found in providing connections to hardware that introduces instability into its environment. For example, the operation of an antenna can produce significant thermal stresses in surrounding circuitry. These thermal stresses can negatively impact the efficiency and the reliability of surrounding components, leading to increased signal attenuation, especially for high frequency signals. If the destabilizing device requires a large number of electrical connections, producing an effective alignment of connectors that will minimize the attenuation and reflection of signals within the connections becomes a difficult and time consuming process.

SUMMARY OF THE INVENTION

The following presents a simplified summary of the invention in order to provide a basic understanding of some aspects of the invention. This summary is not an extensive overview of the invention. It is intended neither to identify key or critical elements of the invention nor delineate the scope of the invention. Its sole purpose is to present some concepts of the invention in a simplified form as a prelude to the more detailed description that is presented later.

In accordance with one aspect of the present invention, a free space optical bus system is provided for connecting two units of circuitry across a free space gap. A first unit of circuitry includes a multiplexer that combines a plurality of bus signals to obtain an electronic combined signal and a laser that is driven by the electronic combined signal to transmit an optical signal. A second unit of circuitry is separated from the first unit of circuitry by a free space gap. The second unit of circuitry includes a photodetector that receives the optical signal and transforms it into an electronic composite signal and a demultiplexer that divides the composite signal into a plurality of constituent signals.

In accordance with another aspect of the invention, a method is provided for transmitting a plurality of information carrying signals across a free space gap. A plurality of information carrying signals are combined to form a combined signal. A laser is driven with the combined signal to transmit an optical signal across a free space gap. The optical signal is transformed into a composite electronic signal. The composite electronic signal is divided into plurality of constituent signals, each corresponding to one of the information carrying signals.

In accordance with yet another aspect of the present invention, a free space optical bus system is provided. The system comprises means for combining a plurality of low data rate signals into a high data rate signal. The system also includes means for transmitting the high data rate signal across a free space gap as an optical signal. The system further comprises means for dividing the high data rate signal back into the plurality of low data rate signals.

To the accomplishment of the foregoing and related ends, certain illustrative aspects of the invention are described herein in connection with the following description and the annexed drawings. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

DETAILED DESCRIPTION OF INVENTION

The present invention relates to a system and method for transferring one or more information carrying signals across a free space gap as part of an optical bus. In accordance with an aspect of the present invention, a plurality of bus signals are multiplexed into a combined signal, which is used to drive a laser. The laser produces an optical signal that is transmitted across a free space gap. The optical signal is received across a free space gap at a receiver. The optical signal is transformed back into an electrical signal, and demultiplexed to recover its constituent signals.

The present invention enjoys several advantages over the prior art. For example, signals transmitted over copper wire attenuate over distance at a rate that varies with the frequency of the signal. Accordingly, a high data rate cannot be sustained over copper media for long distances. Free space optical signals avoid these attenuation problems. To the extent that there are attenuation problems with the free space optical signal, those problems can be alleviated by passive means, such as a collimating lens located at the optical transmitter. A further advantage can be found in the elimination or severe reduction of a separate system bus; the free space optical bus of the present invention can be mounted to a circuit board or other unit of circuitry for direct transfers between units of circuitry. This reduces the distance that the signal travels, mitigating attenuation.

Figure 1:
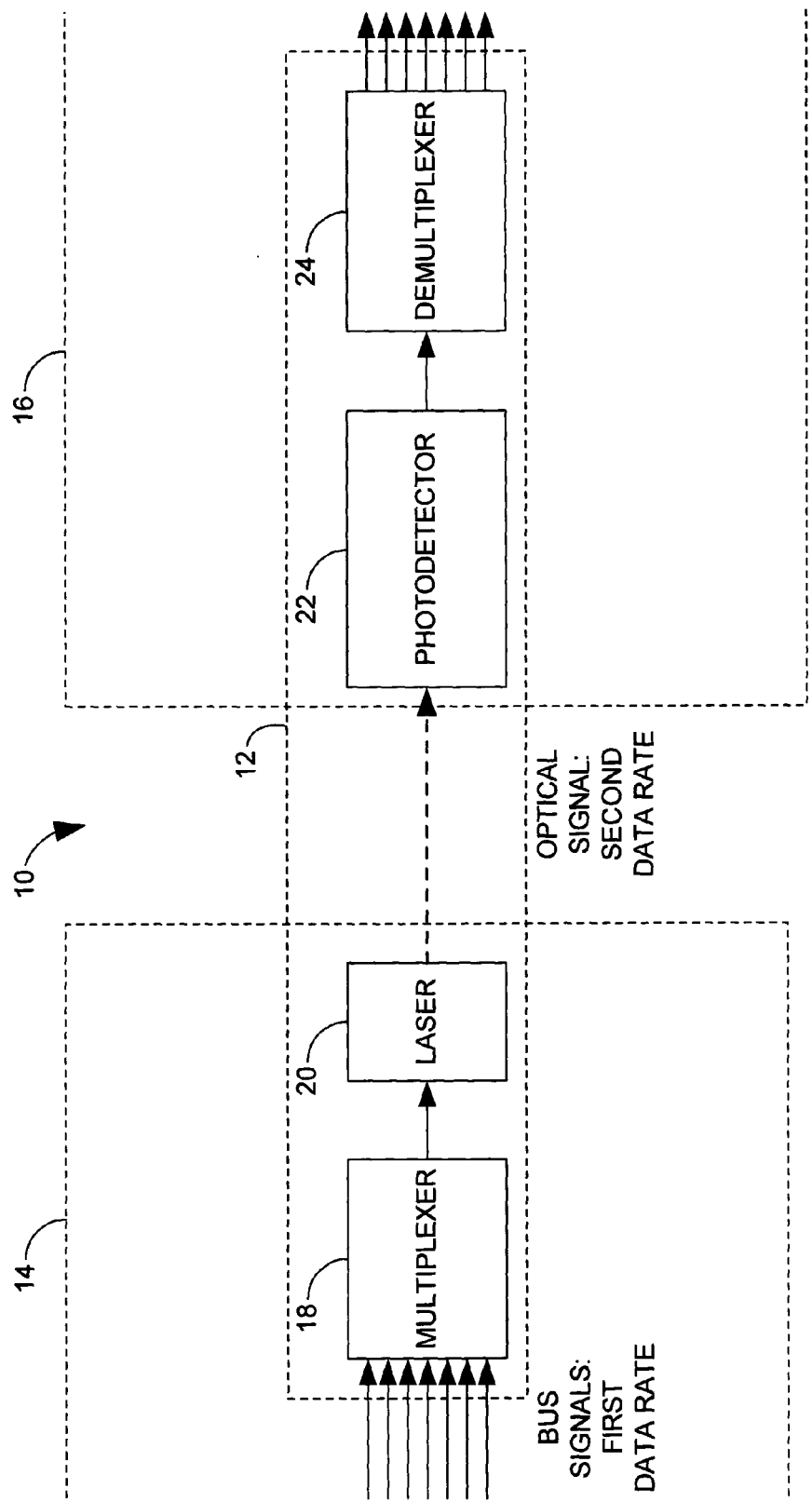
FIG. 1 illustrates a signal processing system containing a free space optical bus in accordance with an aspect of the present invention.

FIG. 1 illustrates a signal processing system 10 containing a free space optical bus 12 in accordance with an aspect of the present invention. The free space optical bus 12 of the illustrated system 10 connects a first unit of circuitry 14 and a second unit of circuitry 16. It will be appreciated that these units of circuitry can comprise any discrete units of circuitry requiring a plurality of interconnections with another discrete unit of circuitry. For example, the bus can connect two or more circuit boards, two or more backplanes, or two or more blocks of components within a single circuit board.

The bus includes a multiplexer 18, located on the first unit 14, for combining a plurality of input bus signals at a first data rate into a single signal at a second data rate. These bus signals can comprise any type of electronic signal that can be sent via a system bus, such as data signals, address signals, and control signals. The multiplexer 18 can multiplex the signals according to any appropriate method for combining multiple signals such as time division multiplexing, frequency division multiplexing, and code division multiplexing. In an exemplary embodiment, a form of time division multiplexing is used to serialize the input signals into a single, high data rate signal.

The output of the multiplexer 18 is used to drive a laser 20, also located on the first unit 14. The laser 20 transmits an optical signal at the second data rate across a free space gap between the first unit 14 and the second unit 16. The term "free space gap" is defined as an unbridged spacing between two units of circuitry such that an optical signal transmitted between the boards passes through a background medium (e.g., air or vacuum) as opposed to a specific carrier medium, such as a fiber optic cable. In other words, when utilizing the free space optical bus of the present invention, two units of circuitry do not need to be physically connected in any fashion to communicate. It will be appreciated, however, that physical connection unrelated to the optical bus can exist between the boards within the scope of the present invention. In an exemplary embodiment, the laser 20 transmits an optical signal in the near infrared range at a wavelength approximately 850 nm. It will be appreciated, however, that lasers having other characteristics wavelengths may be used, included, but not limited to, wavelengths in the visible light range, wavelengths in the ultraviolet range, and higher infrared wavelengths.

The light beam from the laser 20 is received at the second unit 16 by a photodetector 22. The photodetector 22 detects the laser signal and transforms the optical signal from the laser 20 into an electronic composite signal at the second data rate. The photodetector 22 can comprise any of a number of photovoltaic or photoconductive devices, including photomultiplier tubes, avalanche photodiodes, or positive intrinsic negative (PIN) diodes. In the exemplary embodiment, a PIN diode is used to provide an electronic equivalent of the optical signal.

The electronic signal output of the photodetector 22 is provided to a demultiplexer 24. The demultiplexer 24 converts the electronic composite signal from a single signal at the second rate to a plurality of constituent signals at the first rate. The demultiplexer 24 operates to demultiplex the signal by a method corresponding to the multiplexing technique employed by the multiplexer 18. The constituent signals output from the demultiplexer are provided to one or more destinations (not shown) on the second unit 16.

It will be appreciated that the free space optical bus 12 of the illustrated system is not limited to communications between two adjacent units. For example, the bus 12 can be extended to transmit systems across an adjacent board to reach a distant board. Where the gap between the two units is large (e.g., greater than 10-12 inches), a collimating lens can be placed at the laser 20 to reduce dispersion of the optical signal. Two-way communication can be achieved using multiple or reconfigurable receivers and transmitters with appropriate routing.

Figure 2:
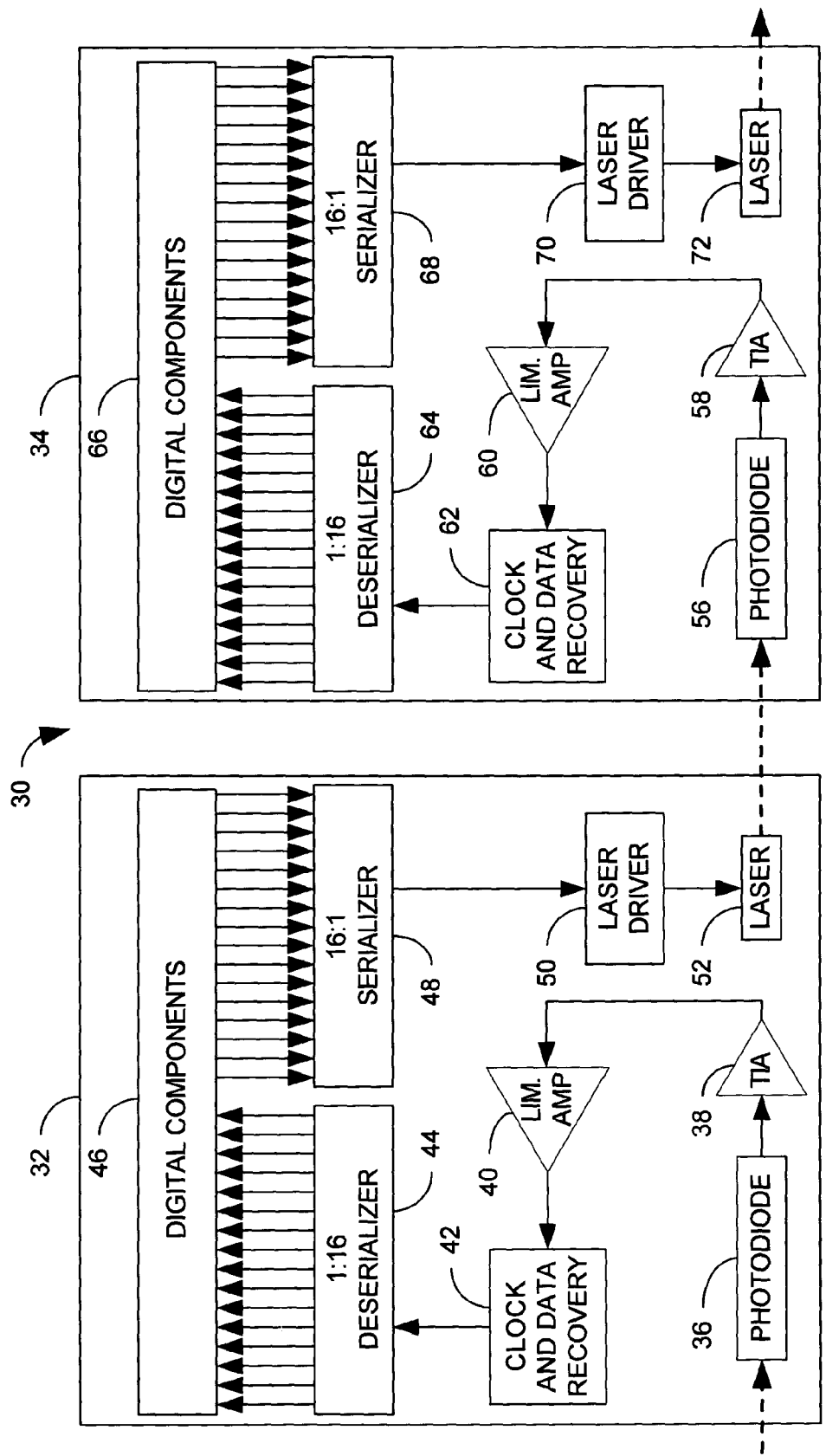
FIG. 2 illustrates an exemplary signal processing system incorporating a free space optical bus in accordance with an aspect of the present invention.

FIG. 2 illustrates an exemplary signal processing system 30 incorporating a free space optical bus in accordance with an aspect of the present invention. The illustrated system 30 includes a plurality of circuit boards, of which a first board 32 and a second board 34 are shown. The illustrated boards incorporate a free space optical system bus that provides one-way communication across the boards. It will be appreciated that the present invention is not limited to a one-way serial configuration and that other bus configurations can be employed using the free space optical bus of the present invention.

The first board 32 receives a high data rate optical signal from a third board (not shown) at a first photodiode 36. In the illustrated system 30, the high data rate optical signal is a composite signal comprising sixteen constituent signals. The first photodiode 36 generates an electrical current that represents the magnitude of the optical composite signal. In the illustrated system 30, the first photodiode is a PIN diode.

The electrical current generated by the photodiode 36 is passed to a transimpedance amplifier 38 (TIA). The transimpedance amplifier 38 translates the current into a voltage representative of the high data rate composite signal and provides a first amplification of the signal. This first amplification is by necessity limited to a relatively small gain, as the gain of a transimpedance amplifier 38 depends directly upon the operating frequency. To ensure that small voltage signals (e.g., signals in the 1 mV to 2 mV range) are received cleanly, it is desirable to subject the signal to a second stage of amplification.

The output of the transimpedance amplifier 38 is provided to a limiting amplifier 40. The limiting amplifier 40 further amplifies the composite signal to prepare the signal for further processing. The limiting amplifier 40, however, limits its output to a predetermined voltage range regardless of the amplitude of the input signal. This allows for weaker signals to receive significant amplification without allowing stronger signals to overwhelm downstream electrical components.

The output of the limiting amplifier 40 is provided to a clock and data recovery circuit (CDR) 42. The clock and data recovery circuit 42 restores an original data stream from the amplified composite signal. The CDR 42 synchronizes the recovered data to a system clock and makes amplitude level decisions on the received signal to produce a regenerated data stream. The synchronization of the system clock with the data stream can be facilitated by a phased-locked loop. The output of the CDR, a composite electronic signal, is passed to a deserializer 44.

The deserializer 44 divides the regenerated composite signal into its sixteen constituent signals. Each of the constituent signals will have an associated data rate approximately one-sixteenth the data rate of the composite signal. The sixteen constituent signals are passed to one or more digital components 46. The nature of the digital components 46 will vary with the application, and can include any appropriate digital circuitry. The digital components 46 perform their respective functions and output a plurality of low data rate bus signals, derived from the constituent signals, to a serializer 48.

The serializer 48 combines the low data rate bus signals to form a high data rate combined signal. The serializer 48 of the illustrated example takes a packet of digital bits from each of the bus signals and arranges them in a predetermined order to provide the combined signal. As the serializer 48 combines the information carried by the sixteen bus signals into a single combined signal, the data rate of the combined signal is approximately sixteen times that of the bus signals. In the illustrated example, the serializer 48 uses a phase locked loop and an external reference clock (not shown) to generate an appropriate signal clock within the combined signal.

The combined signal is provided to a laser driver 50. The laser driver 50 produces a drive signal for a laser 52 from the combined signal. In an exemplary embodiment, the laser driver 50 includes an external resistor (not shown) that compensates for the effect of temperature changes on the laser 52. The laser 52 provides a high data rate optical signal across a free space gap that carries the information within the combined signal. In the exemplary embodiment, the laser operates at a wavelength of about 850 nanometers.

The high data rate optical signal is received at the second board 34 at a second photodiode 56. The second photodiode translates the optical signal into a high data rate electronic composite signal and passes it to a second TIA 58. The second TIA 58 provides a preliminary gain to the electronic signal from the second photodiode 56. The composite signal is then passed to a second limiting amplifier 60, where it is amplified to a desired power level. As with the first limiting amplifier 40, the second limiting amplifier 60 is designed to prevent the signal from achieving a power level outside of predetermined minimum and maximum boundaries.

The amplified signal is provided to a clock and data recovery circuit (CDR) 62. The CDR 62 restores the timing and amplitude characteristics of the electronic signal to approximate the signal output from the first serializer 48. The restored signal is passed to a second deserializer 64. The second deserializer 64 divides the packets of digital bits comprising the composite signal into sixteen streams to form sixteen constituent signals. These constituent signals correspond to the sixteen bus signals combined at the first serializer 48. The constituent signals are then passed to a second set of one or more digital components 66. The function of this second set of digital components will vary with the application.

The output of the second set of one or more digital components 66 will comprise sixteen constituent signals. The signals are provided to a second serializer 68. The second serializer 68 produces a combined signal from the sixteen constituent signals and passes them to a second laser driver 70. The second laser driver 70 drives a second laser 72 to transmit an optical signal across a free space gap. This optical signal will be received at a fourth circuit board (not shown) for further processing of the signal. It will be appreciated that the optical bus of the illustrated implementation can be extended to any number of boards using the described configuration.

Figure 3:
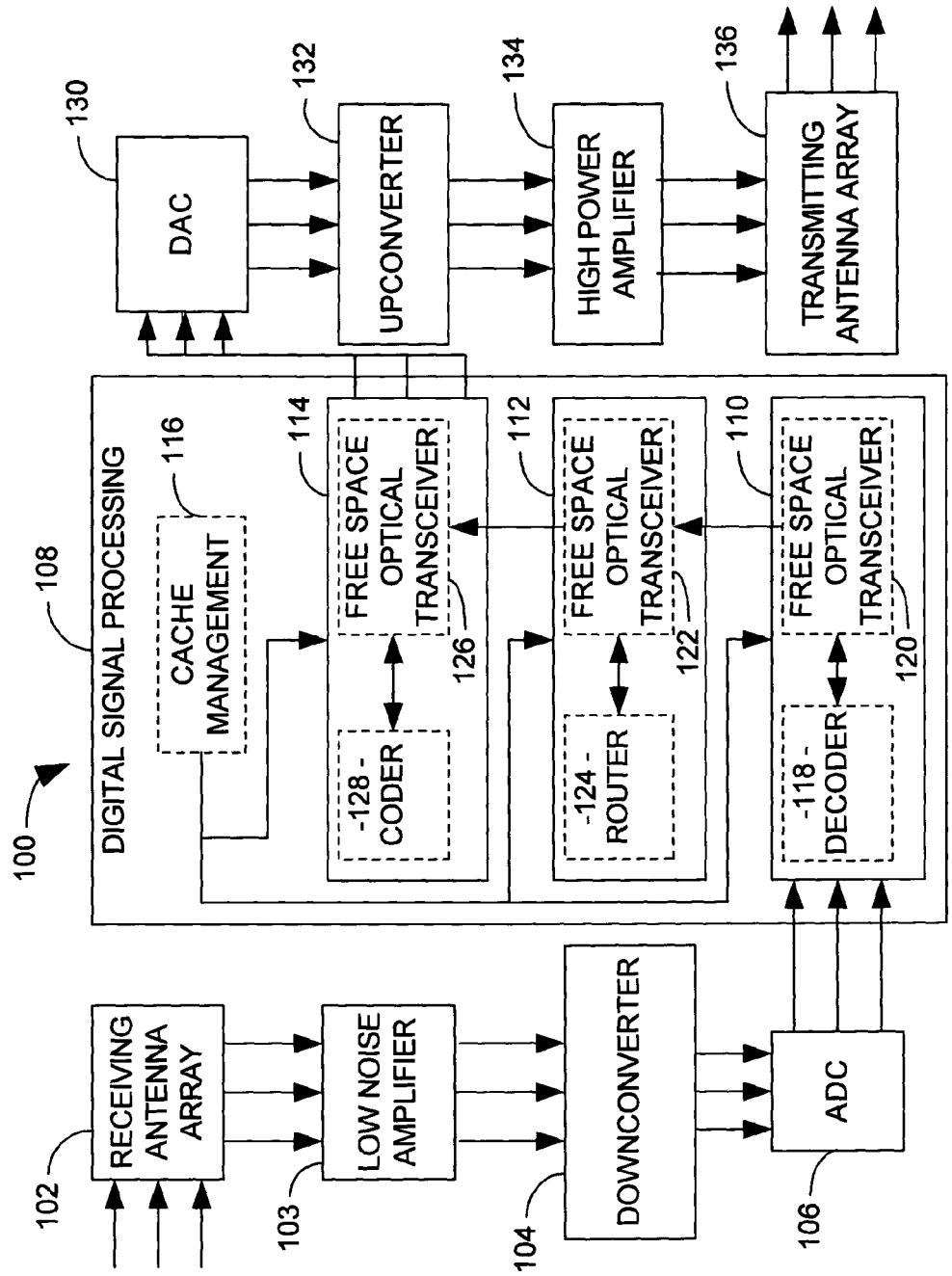
FIG. 3 illustrates an exemplary communications system implementing a free space optical bus as part of a digital signal processing module in accordance with an aspect of the present invention.

FIG. 3 illustrates a digital communications system 100 implementing a free space optical bus in accordance with an aspect of the present invention. In the illustrated implementation, the digital communications system 100 is implemented aboard a spacecraft, but it will be appreciated that the free space optical bus of the present invention can be implemented in ground-based communications systems, as well as other ground-based and spacecraft applications.

A plurality of radio frequency communications signals are received at a receiving antenna array 102. The receiving antenna array transforms the radio frequency signals to analog electronic signals and passes the electronic signals to a low noise amplifier 103 where the signals are amplified to an appropriate level for further processing. The amplified signals are then passed to a downconverter 104 where they are downconverted to a lower frequency. The downconverted analog signals are then passed to an analog-to-digital converter (ADC) 106, where digital representations of the signals are produced.

The digital signals are provided to a series of digital signal processing components 108. The signals can be provided by a conventional signal bus or by a free space optical bus in accordance with an aspect of the present invention. It will be appreciated that the described digital signal processing components 108 are merely exemplary and are simplified for the sake of illustration. The illustrated circuit boards 110, 112, and 114 comprising the digital signal processing components 108 represent broad functions within the communication systems that can be distributed across multiple boards and various locations within the system.

For example, each of the illustrated circuit boards 110, 112, and 114 are operatively connected to a cache management function 116. The cache management function 116 maintains an orderly input of signals into the digital processing components 108 by storing excess signals in a cache until processing resources become available. Each board employs cache memory for storing received signals and a cache management function for prioritizing received signals within the cache. In the illustrated implementation, this cache management function 116 is distributed across the circuit boards 110, 112, and 114 as one or more digital components and a signal cache on each board.

The digital signals from the analog-to-digital converter 106 are received at a first circuit board 110 at a decoder 118. The decoder 118 reviews the signals for error according to encoded error detection bits within the received signals. For example, the parity of the received signals might be checked against a parity bit within a header portion of each signal. It will be appreciated that more sophisticated error detection techniques can be employed within the scope of the claimed invention. The decoded signals are provided to a first free space optical transceiver 120 in accordance with an aspect of the present invention.

The free space optical transceiver 120 multiplexes the plurality of signals and passes them to a second free space optical transceiver 122 as an optical signal. The second free space optical transceiver 122 translates the optical signal into a composite electronic signal and demultiplexes the composite signal into its constituent signals. These constituent signals are provided to a router 124 that provides routing information for the signal. For example, the router 124 can provide header information assigning the signal to a particular batch of signals according to a desired destination. The routed signals are then returned to the second free space optical transceiver 122, where they are multiplexed and provided to a third free space optical transceiver 126 as an optical signal.

At the third free space optical transceiver 126, the optical signal is transformed into a composite electronic signal and demultiplexed into a plurality of constituent signals. The constituent signals are provided to a coder 128. The coder 128 encodes error detection bits into the signals to facilitate the detection of errors in the signal after transmission. For example, this error coding can take the form of a parity bit added to the header of the signal. The coded signals are then provided to a digital-to-analog converter 130. It will be appreciated that the signals can be provided by a conventional bus or by a free space optical bus in accordance with an aspect of the present invention.

The digital-to-analog converter 130 converts the digital signals into their analog equivalents. The analog signals are then provided to an upconverter 132 that converts the signals up to an appropriate transmission frequency. The upconverted signals are then amplified at a high power amplifier 134 and provided to a transmitting antenna array 136 where the amplified signals are broadcast to one or more receivers.

Figure 4:
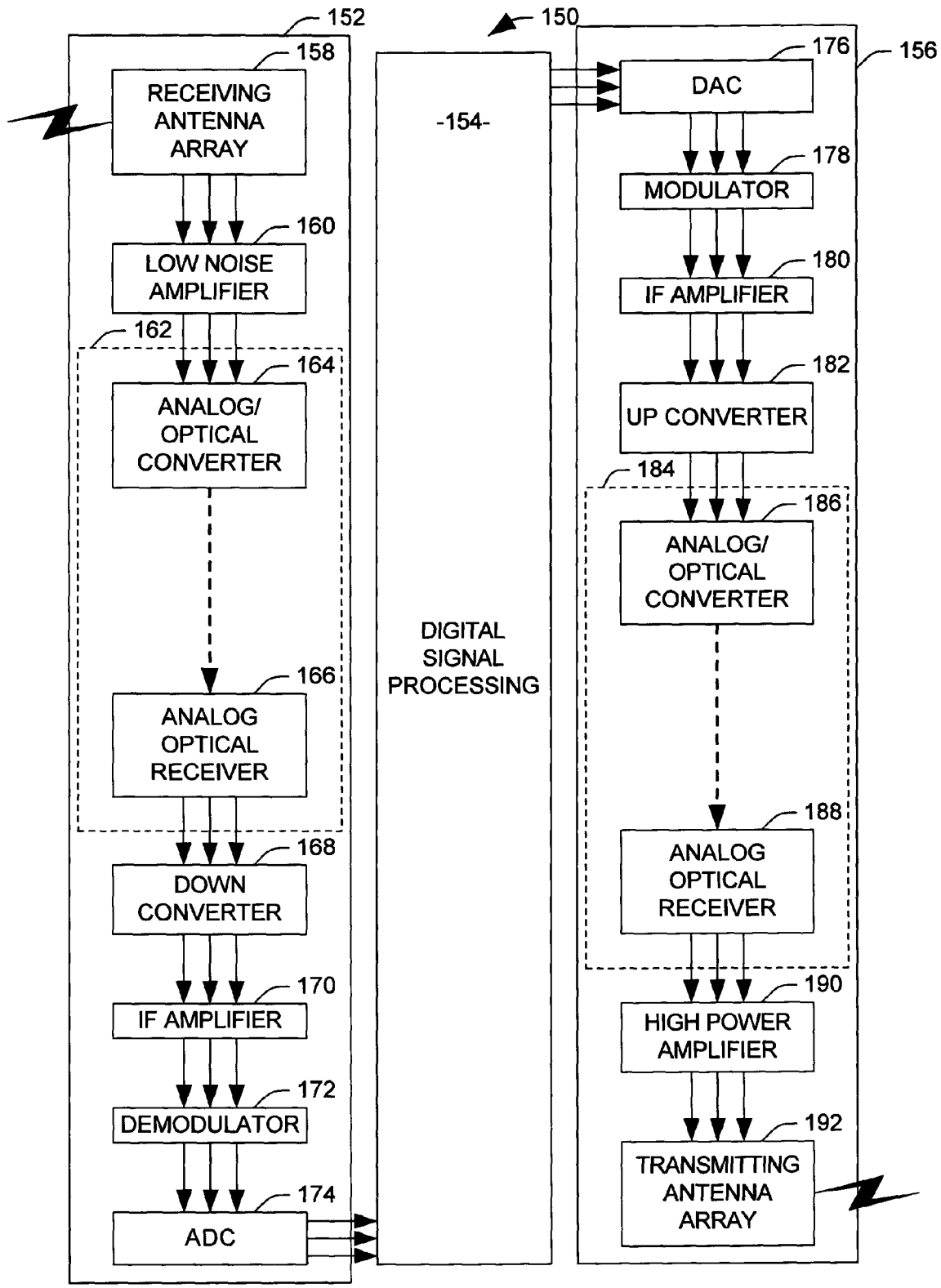
FIG. 4 illustrates an exemplary communications system implementing a free space optical bus as part of an interconnection between one or more antenna arrays and a digital signal processing module in accordance with an aspect of the present invention.

FIG. 4 illustrates an exemplary communications system 150 implementing a free space optical bus as part of an interconnection between one or more antenna arrays and a digital signal processing module. In the illustrated system 150, a receiving assembly 152 receives one or more radio frequency (RF) signals and provides one or more digital signals to a digital signal processing module 154 for processing. Digital processing of the signals can include confirming the integrity of the received signals, routing the signals to new destinations, and coding error checking information into the routed signals. The processed signals are provided to a transmitting assembly 156 to be rebroadcast as radio frequency signals. It will be appreciated that although the structures within the receiving assembly 152 and the transmitting assembly 156 are described as separate structures for the sake of clarity, in practice, structures within these assemblies 152 and 156 can overlap. For example, a structure described herein as a receiving antenna array and structure described as a transmitting antenna array can comprise a single antenna array performing multiple functions.

The receiving assembly 152 includes a receiving antenna array 158 that translates one or more RF signals into analog electrical signals. The analog signals are amplified at a low noise amplifier 160 to increase the amplitude of the signals to a level better suited for analog processing. It will be appreciated that the amplifier will create a significant degree of heat in amplifying the received signals. Accordingly, a first analog free space optical bus 162 can be employed in accordance with an aspect of the present invention to isolate the low noise amplifier 160 from other electronic circuitry within the receiving assembly.

The first free space optical bus 162 comprises a first analog optical converter 164 and a first analog optical receiver 166. The optical converter 164 receives the analog signals, multiplexes them into a combined signal, and drives an optical transmitter (e.g., a laser) with the combined signal to produce an optical bus signal. The optical bus signal is received at the optical receiver 166, where it is translated into an analog signal and demultiplexed into its constituent signals.

The demultiplexed signals are provided to a down converter 168 which converts the signals from a radio frequency to an intermediate frequency. The intermediate frequency (IF) signals are then provided to an IF amplifier, where they are further amplified. The amplified signals are then demodulated at a demodulator 172 and the demodulated baseband information signals are provided to an analog-to-digital converter (ADC) 174. The analog-to-digital converter 174 converts the analog baseband information signals into digital signals and provides them to the digital signal processing module 154.

The receiving assembly 156 receives one or more digital signals from the digital signal processing module 154 at a digital to analog converter (DAC) 176. The digital-to-analog converter 176 converts the digital signals into analog signals and provides them to a modulator 178. The modulator 178 modulates the baseband signals with intermediate frequency carriers and provides the resulting signals to an intermediate frequency amplifier 180.

The intermediate frequency amplifier 180 provides a first amplification to the intermediate frequency signals. The amplified signals are then provided to an up converter 182. The up converter converts the signals from an intermediate frequency to a radio frequency suitable for broadcast. The upconverted signals are then provided for a second analog free space optical bus 184.

The second free space optical bus 184 comprises a second analog optical converter 186 and a second analog optical receiver 188. The second optical converter 186 receives the analog signals, multiplexes them into a combined signal, and drives an optical transmitter (e.g., a laser) with the combined signal to produce an optical bus signal. The optical bus signal is received at the second optical receiver 188, where it is translated into an analog signal and demultiplexed into its constituent signals.

The constituent signals are provided to a high power amplifier 190 where the signals are amplified to an appropriate level for transmission. The amplified signals are provided to a transmitting antenna array 192. The transmitting antenna array 192 translates the amplified signals into radio frequency signals and broadcasts them as radio frequency electromagnetic signals. It will be appreciated that although the structures within the receiving assembly 152 and the transmitting assembly 156 are described as separate structures for the sake of clarity, in practice, structures within these assemblies 152 and 156 can overlap. For example, the receiving antenna array 158 and the transmitting antenna array 192 can comprise a single antenna array performing multiple functions.

Figure 5:
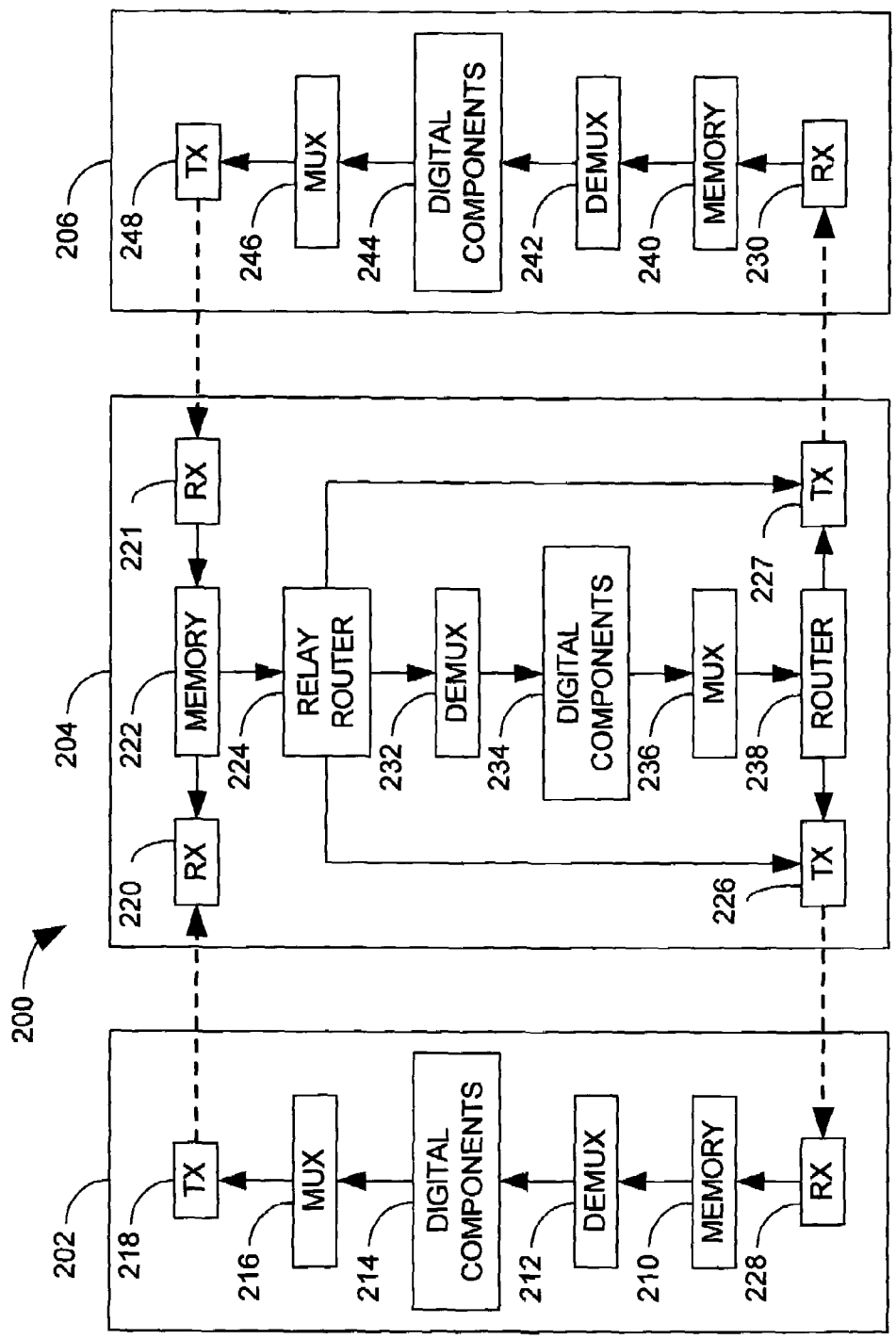
FIG. 5 illustrates an exemplary signal processing system incorporating a two-way free space optical bus in accordance with an aspect of the present invention.

FIG. 5 illustrates an exemplary signal processing system 200 incorporating a two-way free space optical bus in accordance with an aspect of the present invention. The illustrated system 200 comprises three circuit boards, a first board 202, a second board 204, and a third board 206. It will be appreciated that the FIG. 4 focuses on the free space optical bus of the present invention and that various components and interconnects that would be required by a functioning system but are extraneous to the function of the optical bus have been omitted for the sake of clarity. For example, the system 200 is not illustrated as having an external input and output, nor the necessary routing to incorporating these system inputs into the illustrated information stream.

The illustrated boards incorporate a two-way system bus that connects the boards 202, 204, and 206 across a backplane. It will be appreciated that the present invention is not limited to a two-way serial configuration and that other bus configurations can be employed using the free space optical bus of the present invention. For example, in place of the multiple receivers on the second board, a single receiver with an appropriate routing function could be implemented. Similarly, the multiple transmitters could be replaced with a single transmitter, capable of transmitting an optical signal in multiple directions via rotation of the transmitter or reflection off of one or more switched mirrors.

The first circuit board 202 includes a first memory 210 containing high data rate electronic signals received from other circuit boards. Signals are retrieved from the first memory 210 by a first demultiplexer 212 and separated into a plurality of constituent signals. These constituent signals are then provided to a first set of one or more digital components 214 for processing. The nature of the one or more digital components 214 will vary with the application.

The processed signals are then provided to a first multiplexer 216. The multiplexer 216 combines the processed signals into a combined signal. The combined signal is provided to a first optical transmitter 218. The optical transmitter 218 transmits an optical signal to a first receiver 220 on the second circuit board 204. The received signal is transformed into an electrical signal at the first receiver 221 and stored in a second memory 222. The memory 222 also receives signals from a second receiver 221 that is operative to receive and transform signals from the third circuit board 206.

A relay routing control 224 retrieves a signal from the second memory 222 and determines a destination for the signal. For example, the relay routing control 224 can examine header information on the signal to determine which circuit board should process the signal. If it is determined that the signal should be processed at another circuit board, the signal is provided to either a first transmitter 226 or a second transmitter 227, depending on the desired destination board. Signals bound for the first circuit board 202 are provided to the first transmitter 226. The first transmitter 226 transmits the signal as an optical signal to a first board receiver 228 on the first circuit board. Signals received at the first board receiver 228 are provided to the first memory 210. Signals intended for the third circuit board 206 are provided to the second transmitter 227. The second transmitter 227 provides a high data rate optical signal to a third board receiver 230 on the third circuit board.

If the signal is intended to be processed at the second circuit board 204, the high data rate signal is provided to a second demultiplexer 232. The second demultiplexer 232 divides the high data rate electronic signal into a plurality of low data rate constituent signals. These composite signals are provided to a second set of electronic components 234. The second set of electronic components 234 process the constituent signals and pass the constituent signals to a second multiplexer 236. The second multiplexer combines the plurality of constituent signals into a high data rate composite signal. The composite signal is then provided to a router 238 that determines the destination of the composite signal. Signals intended for the first circuit board 202 are provided to the first transmitter 226 and signals intended for the third circuit board are provided to the second transmitter 227.

Signals sent to the third circuit board 206 are received at the third board receiver 232. The received composite signals are stored in a third memory 240. A third demultiplexer 242 retrieves the stored composite signals and divides them into a plurality of constituent signals. The constituent signals are processed at a third set of digital components 244 and provided to a third multiplexer 246. The third multiplexer 246 joins the plurality of constituent signals into a composite signal and provides the composite signal to a third transmitter 248. The third transmitter 248 transmits an optical signal to the second receiver 221 on the second board 204.

Figure 6:
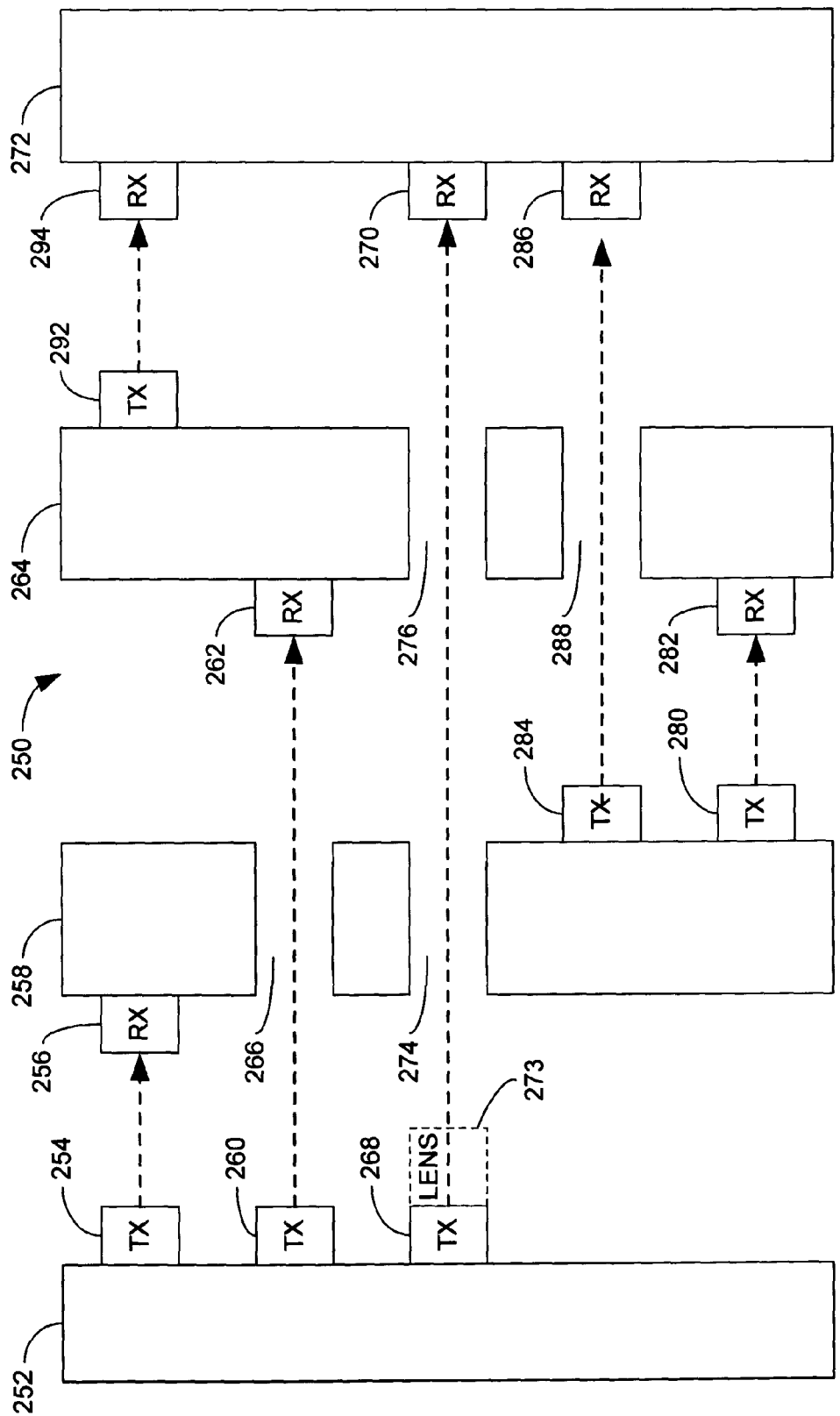
FIG. 6 illustrates a cross-sectional view of an exemplary implementation of a one-way free space optical bus in accordance with an aspect of the present invention.

FIG. 6 illustrates a cross-sectional view of an exemplary implementation of a free space optical bus 250 connecting four circuit boards in accordance with an aspect of the present invention. While the illustrated bus 250 conveys signals only in one direction, it will be appreciated that the bus can be implemented as a two-way bus in accordance with the teachings of the illustration. A first circuit board 252 contains three transmitters. A first transmitter 254 transmits a composite optical signal to a first receiver 256 on a second circuit board 258. A second transmitter 260 transmits a composite optical signal to a second receiver 262 located on a third circuit board 264. For transmissions over short distances, a relay lens or collimator may not be needed. Over long distances, a beam collimator may be required. In an exemplary embodiment, openings (e.g., 266) within a circuit board can include relay lenses (not shown) to further reduce dispersion in the optical signal or to provide a change of direction in the signal through optical diffraction.

It will be appreciated that the transmission of an optical signal across multiple boards in the manner described above requires precise alignment of the various integrated circuit components comprising the optical bus. This precision of alignment, however, is already required to complete the electrical connections for several applications for which the present invention will be advantageous. For example, in a communications satellite, the interconnection density between boards is so high that conventional electrical bus connections already require a great deal of mechanical precision. Accordingly, the advantages of the present invention can be enjoyed in this application, and numerous similar applications, without an undue increase in the precision of the alignments of the boards and their respective connectors.

A third transmitter 268 transmits an optical signal to a third receiver 270 on a fourth circuit board 272. The third transmitter 268 includes a collimating lens 273 that reduces dispersion in the optical signal during transmission. The optical signal from the third transmitter 268 passes through two circuit boards in transmission, a second opening 274 located in the second circuit board 258, and a third opening 276 located in the third circuit board 272. It will thus be appreciated that signals from the first circuit board 252 can be passed in optical form directly to any of the downstream boards 258, 264, and 272 via the openings within the second and third circuit boards. The illustrated free space optical bus does not require a processing step at any board but the transmitting and receiving boards. This allows for rapid transmission of signals between non-adjacent boards.

The second circuit board 258 includes a fourth transmitter 280 that transmits an optical signal to a fourth receiver 282 located on the third circuit board 264. The second circuit board further includes a fifth transmitter 284 that transmits an optical signal to a fifth receiver 286 on the fourth circuit board 272. This transmission passes through a fourth opening 288 located in the third circuit board 264. In an exemplary embodiment, the second circuit board 258 can include yet another transmitter (not shown) for sending signals to upstream circuit boards (e.g., 252). This would allow two-way communication at the cost of increasing the complexity of the bus system.

The third circuit board 264 includes a sixth transmitter 292 that transmits an optical signal to a sixth receiver 294 on the fourth circuit board 272. Like the second circuit board 258, the third and fourth circuit boards 264 and 272 can be adapted to include additional transmitters, allowing two-way communication among the various circuit boards. Configuring the system in a manner consistent with the illustrated system 250, however, requires an increase the number of transmitters and receivers in the system and additional openings within the circuit boards. In the alternative, the existing transmitters and receivers can be utilized with the addition of a plurality of switching mirrors and appropriate routing at the transmitters and receivers to handle signals from multiple sources.

Figure 7:
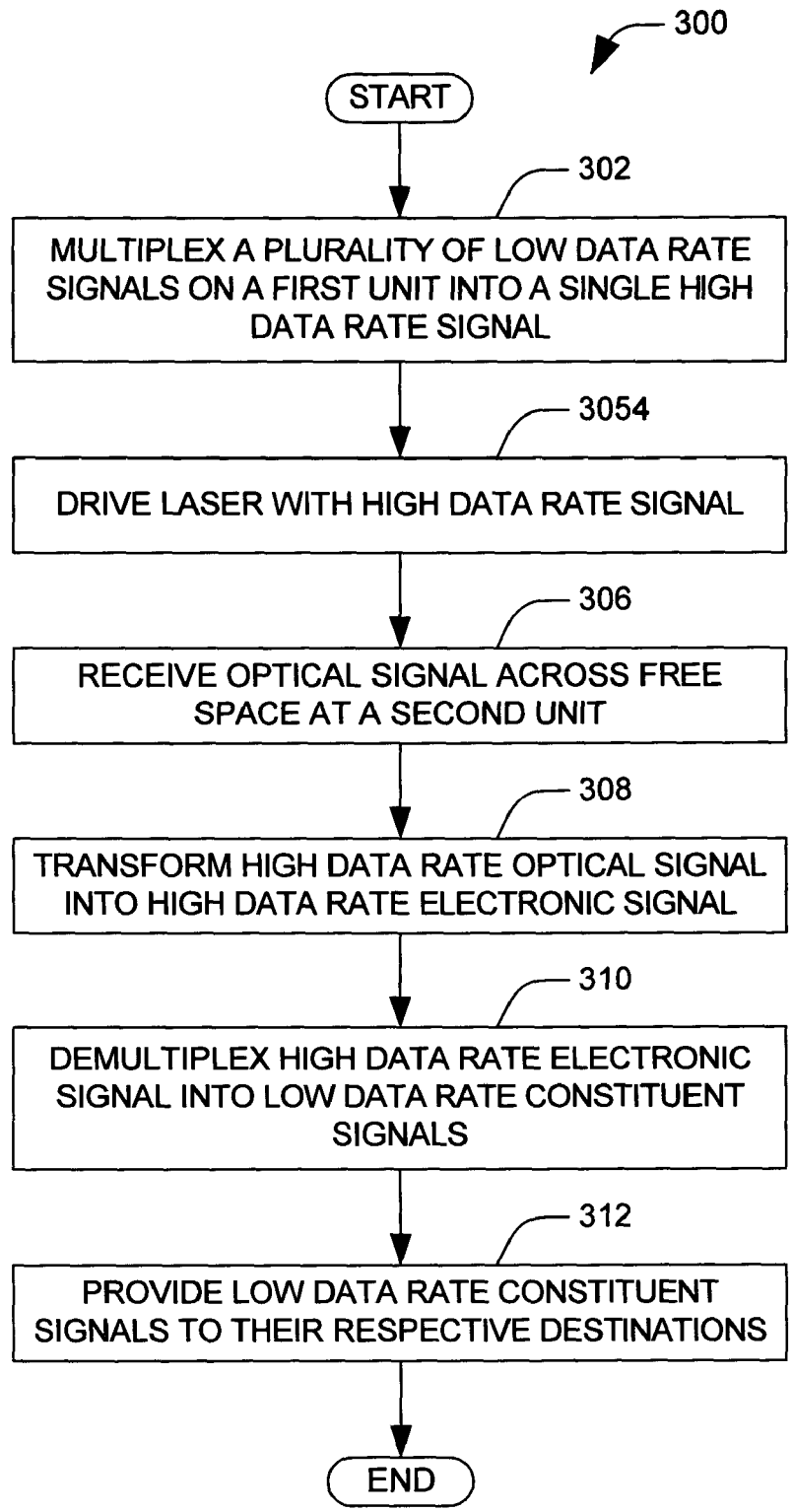
FIG. 7 illustrates an exemplary methodology for transmitting a plurality of bus signals across a free space gap between two units of circuitry in accordance with one aspect of the present invention.

FIG. 7 illustrates an exemplary methodology 300 for transmitting a plurality of bus signals across a free space gap between two units of circuitry in accordance with one aspect of the present invention. The units of circuitry can comprise any discrete units of circuitry requiring a plurality of interconnections with another discrete unit of circuitry, such as two or more circuit boards, two or more backplanes, or two or more blocks of components within a single circuit board. The method 300 begins at block 302, where a plurality of low data rate bus signals are multiplexed into a high data rate combined signal. It will be appreciated that a number of techniques exist for multiplexing a plurality of signals to form a single signal. The technique used in the described methodology 200 will depend on the nature of the multiplexed signals and the specific application.

At block 304, the high data rate combined signal is used to drive a laser on the first unit of circuitry to transmit a high data rate optical signal across a free space gap between the first and second units of circuitry. The generated optical signal will contains the information carried by the combined signal. At block 306, the optical signal is received at the second unit of circuitry. The signal can be received by any appropriate sensor for detecting a quantity of light, including voltaic photodiodes, conductive photodiodes, photomultiplier tubes, or charge coupled devices.

At block 308, the received optical signal is translated into a high data rate electronic signal. This signal is a composite of the information from the original bus signals and should approximate the combined signal used to drive the laser. At block 310, the composite signal is demultiplexed into a plurality of lower data rate constituent signals at a multiplexer. Each of the constituent signals corresponds to one of the multiplexed bus signals. The technique used for demultiplexing will depend on the multiplexing technique used at block 302. At block 312, each of the constituent signals is provided to its respective destination on the second unit of circuitry. For example, the constituent signals can be provided to digital processing components to be processed and bused to yet another unit of circuitry.

Figure 8:
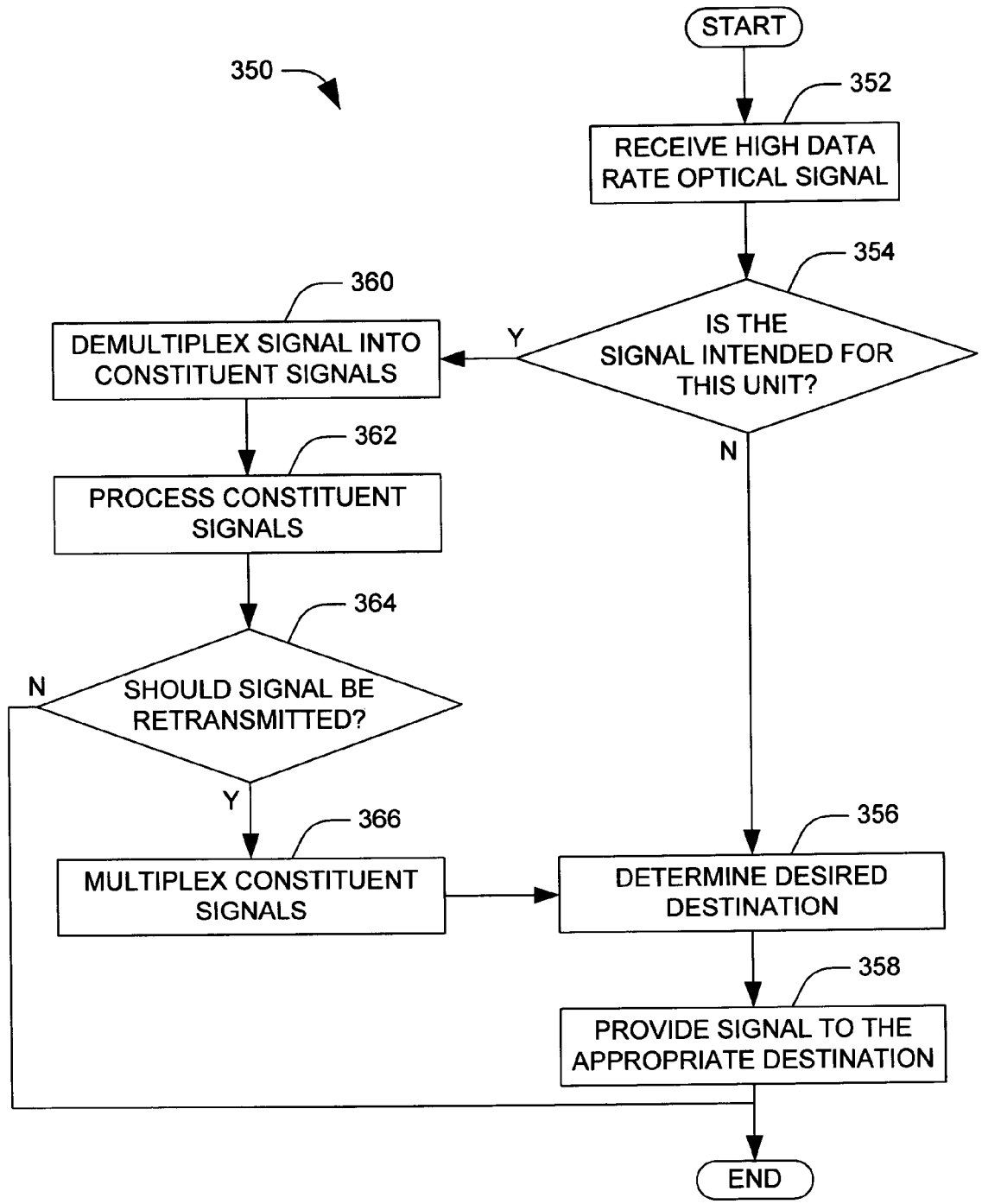
FIG. 8 illustrates a methodology for transmitting a signal on a free space optical bus across a plurality of units of circuitry.

FIG. 8 illustrates a methodology 350 for transmitting a signal on a free space optical bus across a plurality of units of circuitry. The process begins at block 352, where an optical signal having a high data rate is received at a first unit of circuitry. The optical signal is translated to a high data rate electronic signal containing information from a plurality of constituent signals. The process then proceeds to decision block 354, where it is determined if the signal is intended for the first unit of circuitry. Generally, the signal will include a signal header containing routing information for making this determination. If the signal is not intended for the first unit of circuitry, the process continues to block 356, where the desired destination is determined. In essence, it is determined from the signal to which of a plurality of other units of circuitry that the received signal should be provided. At block 358, the signal is provided to the desired destination.

If the signal is intended for the first unit of circuitry, the process proceeds to block 360, where the signal is demultiplexed into a plurality of constituent signals, each having a relatively low data rate. At block 362, these constituent signals are processed at one or more digital components. The nature of these components will vary with the purpose of the first unit of circuitry. At decision block 364, it is determined if the signal should be transmitted to another unit of circuitry. If not, the process terminates. If so, the process proceeds to block 366, where the constituent signals are multiplexed to form a high data rate composite signal. Header information can be added to the signal to aid in routing the composite signal to an appropriate destination. The process continues to block 356, where the desired destination is determined. The destination can be determined form header information within the signal, by some other characteristic of the signal, or by external instructions to the system. At block 358, the signal is provided to the desired destination.

What has been described above includes exemplary implementations of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

What is claimed is:

1. A free space optical bus system implemented in a communication satellite orbiting the earth comprising:

a first unit of circuitry of the free space optical bus system implemented in the communication satellite orbiting the earth comprising:

an antenna array that translates a plurality of radio frequency signals into a plurality of electrical signals;

an amplifier that provides a plurality of bus signals based on the plurality of electrical signals;

a multiplexer that combines the plurality of bus signals to obtain an electronic combined signal; and a laser that is driven by the electronic combined signal to transmit an optical signal across a free space gap;

a second unit of circuitry of the free space optical bus system implemented in the communication satellite orbiting the earth, separated from the first unit of circuitry by the free space gap, comprising:

a photodetector that receives the optical signal and transforms it into an electronic composite signal;

a demultiplexer that divides the composite signal into a plurality of constituent signals; and at least one analog signal processing component that processes at least one of the plurality of constituent signals.

2. The system of claim 1, the photodetector comprising a positive intrinsic negative diode.

3. The system of claim 1, the second unit of circuitry further comprising a router that provides routing information to each of the plurality of constituent signals.

4. The system of claim 1, the first unit of circuitry further comprising a decoder that reviews the bus signals for error according to at least one encoded error detection bit within the bus signals.

5. The system of claim 1, the second unit of circuitry further comprising a coder that encodes at least one error detection bit in the constituent signals.

6. The system of claim 1, wherein the free space gap comprises a vacuum.

7. The system of claim 6, the second unit of circuitry further comprising a limiting amplifier that amplifies the electronic composite signal.

8. The system of claim 1, the plurality of bus signals being transmitted at a first data rate, and the optical signal being transmitted at a second data rate.

9. The system of claim 1, further comprising at least one digital component that processes the plurality of constituent signals.

10. The system of claim 1, the second unit of circuitry further comprising a second laser that transmits an optical signal to a second photodetector on the first unit of circuitry.

* * * * *